Figure 1:
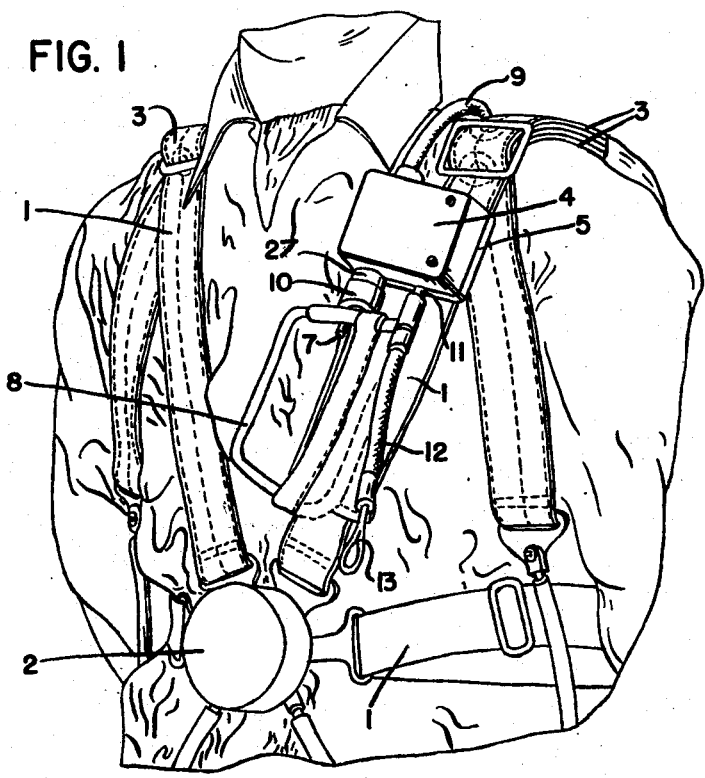

April 27, 1954  J. E. HATFIELD  2,676,655
PARACHUTE-RELEASING MECHANISM
Filed March 26, 1951  4 Sheets-Sheet 1

Inventor
John Edward Hatfield

Attorney

April 27, 1954     J. E. HATFIELD     2,676,655
PARACHUTE-RELEASING MECHANISM
Filed March 26, 1951            4 Sheets—Sheet 2
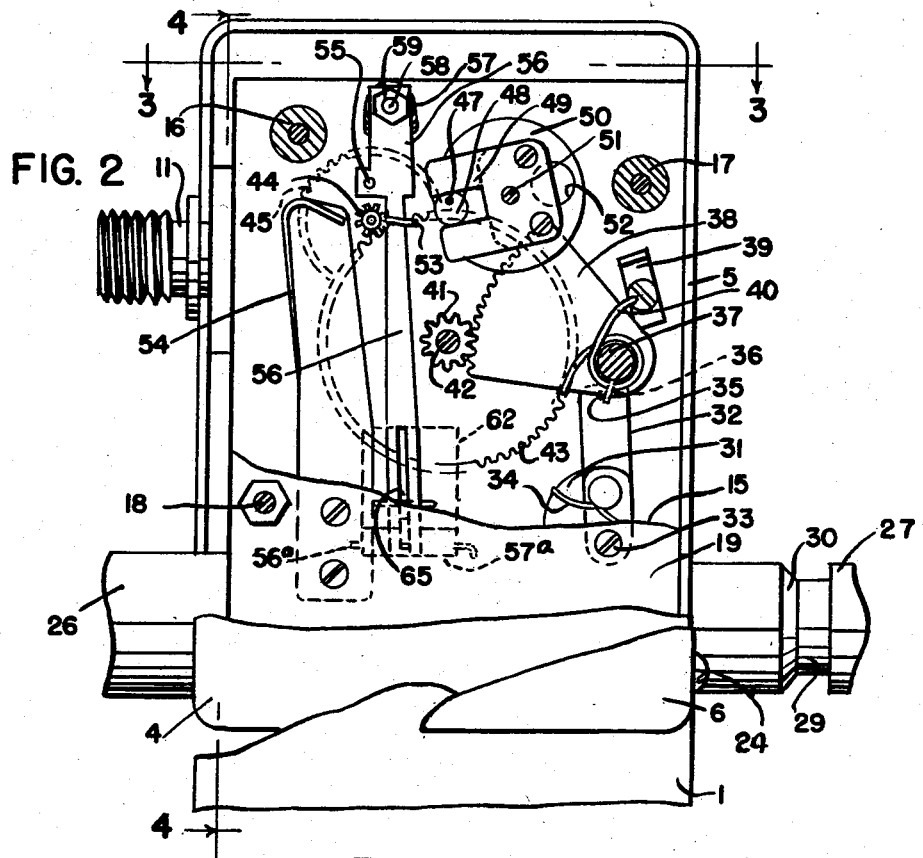
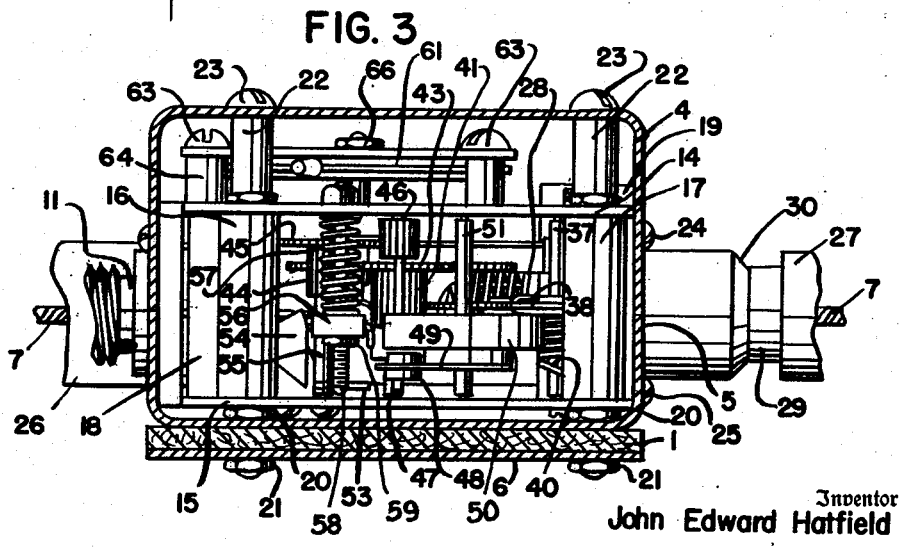
Inventor
John Edward Hatfield
By
Attorneys

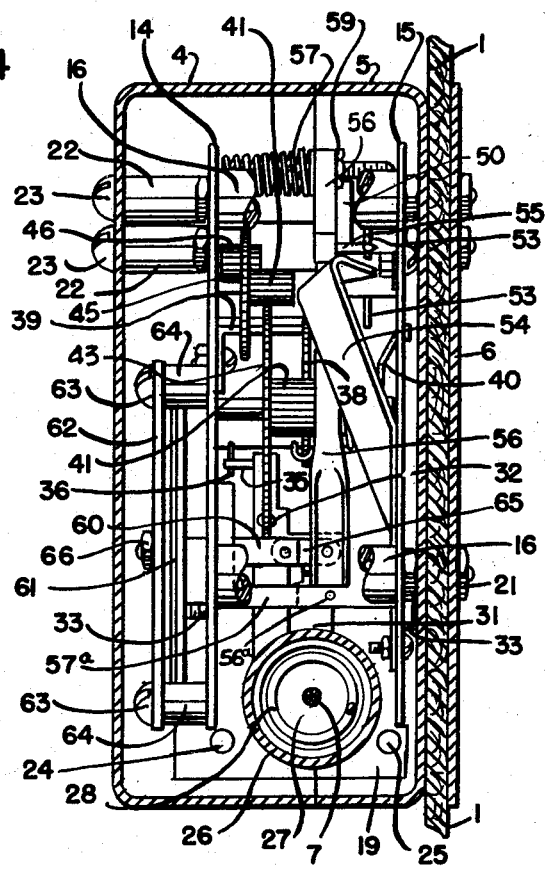

April 27, 1954  J. E. HATFIELD  2,676,655
PARACHUTE-RELEASING MECHANISM
Filed March 26, 1951  4 Sheets-Sheet 4
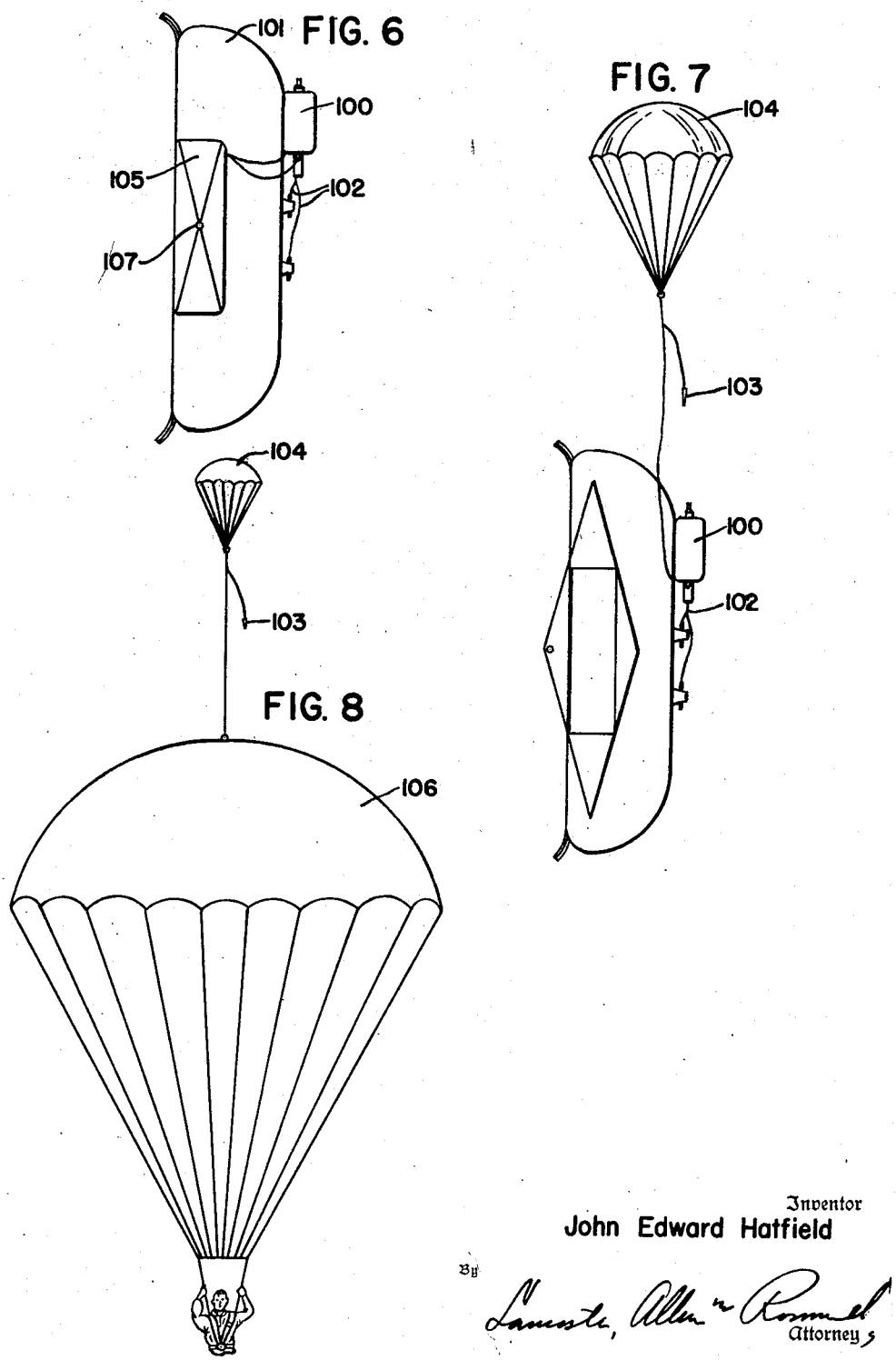
Inventor
John Edward Hatfield Patented Apr. 27, 1954

2,676,655

UNITED STATES PATENT OFFICE 2,676,655

PARACHUTE-RELEASING MECHANISM

John E. Hatfield, Stotfold, England

Application March 26, 1951, Serial No. 217,466

10 Claims. (Cl. 161—1)

This invention is concerned with improvements in or relating to mechanism for automatically releasing a parachute from its pack and has for one of its objects to provide a simple, compact and efficient device which prevents the automatic freeing of the parachute in circumstances where the atmospheric pressure is below a predetermined minimum value, or the speed of the parachutist is above a safe maximum value.

In certain circumstances, such for instance as when a parachutist has to leave his aircraft at very high altitudes, it is imperative or very desirable that he should drop rapidly through the rarefied atmosphere and that his parachute should only be caused or permitted to open when he has fallen into an atmosphere of appropriate pressure and having an appropriate oxygen content. In an endeavour to satisfy these requirements it has been proposed to provide release mechanism associated with a barometrically controlled device which automatically effects the release of the parachute when a suitable altitude is reached and assuming of course that the release mechanism is in a condition for being freed by the barometrically controlled device, for instance as a result of actuation of a static line, manually operated rip ring or the like. It has for instance been proposed to endeavour to remove a stop pin out of the path of spring-actuated parachute-releasing mechanism by means of a clockwork motor, the clockwork motor being in turn released for operation by a barometric device in conjunction with a master control such as a control actuated by a static line, but owing to the heavy loading on the clockwork motor due to the necessarily strong spring employed for releasing the parachute there is the danger that the clockwork motor will be unduly delayed in starting its movement or even prevented from operating at all even though it be released so far as the said control or controls is or are concerned.

A further and more specific object of the present invention is to provide release mechanism wherein the above mentioned danger of failure of operation is greatly reduced or entirely removed.

According to the present invention there is provided spring-actuated mechanism for releasing a parachute from its pack in combination with means for controlling the freeing of said spring-actuated mechanism for movement to a parachute-releasing condition, said means being themselves driven in a releasing direction by the spring-actuated mechanism and associated with subsidiary control means consisting of or including a barometrically controlled device.

The aforesaid barometrically controlled device is so disposed as to prevent the freeing of the control for the spring-actuated mechanism excepting in conditions where the atmospheric pressure is above a predetermined minimum value, and means may be provided whereby the barometric device attains its released condition at any desired atmospheric pressure.

The aforesaid subsidiary control means may also include an independent device adapted for operation for instance by a static line, manually operable rip-ring or the like or pilot parachute, so as to ensure that the release of the spring-actuated mechanism will not necessarily take place merely because the equipment is disposed in an atmosphere of which the pressure is below a critical value. If however the aforesaid device which is controlled by a static line, rip-cord, pilot parachute or the like is moved in a parachute-releasing direction at a height where the pressure conditions are inappropriate for the freeing of the parachute then such barometrically controlled device will prevent any movement of the spring-actuated mechanism until such time as an appropriate altitude has been reached, whereupon the spring-actuated mechanism will be automatically freed for initiation of its parachute-releasing movement.

The means for controlling movement of the spring-actuated mechanism to a parachute-releasing condition may be of any suitable kind but are preferably such as to provide for a variable time delay between the moment when they are freed for actuation and the moment when they are in a condition for allowing actual release of the parachute. Thus for instance said control means may comprise a gear train in conjunction with a variable escapement mechanism or governor and/or provision for varying the amount of movement requisite for freeing the spring-actuated mechanism for movement to a parachute-releasing condition.

The above mentioned spring-actuated mechanism may be of various different kinds and may for instance include a compression spring having a movable abutment cooperating with one end thereof, such abutment being so associated with the control mechanism that when the latter is freed for movement the spring expands so moving the abutment and driving the control mechanism until such time as the abutment is moved out of cooperation with the spring whereupon the said spring moves to its parachute-releasing condition.

If desired parachute-releasing means in accordance with the present invention may also include manually controlled means, e. g. a rip cord or the like, which can be operated quite independently of the automatically operable release mechanism for effecting release of a parachute from its pack.

Figure 5:
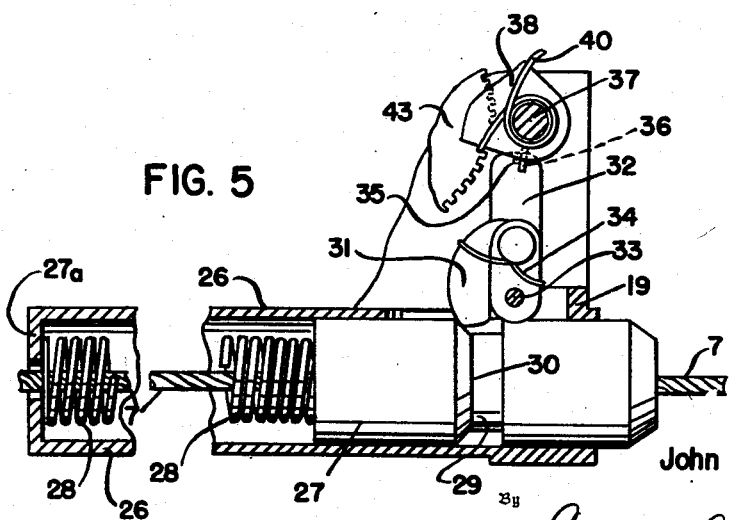

In order that the present invention may be well understood, I will now describe, by way of example only, one embodiment thereof with reference to the accompanying drawings in which:

Figure 1 shows one form of parachute release mechanism fitted to a parachutist's harness, Figure 2 is a plan view of the release mechanism with part of the base portion broken away to expose certain internal parts, Figure 3 is a cross-sectional plan view taken on the line III—III of Figure 2, Figure 4 is a cross-sectional side view taken on the line IV—IV of Figure 2, Figure 5 is a sectional view of a detail of the mechanism shown in Figures 1 to 4, Figure 6 is a side elevation of a parachute pack provided with release mechanism similar to that shown in Figures 1 to 5 but including a different form of subsidiary control, Figure 7 is a side elevation of the mechanism shown in Figure 6 but in a partially released position, and Figure 8 shows the fully released and deployed parachute.

Referring to Figures 1 to 5, certain of the straps of a known form of parachute harness are shown in Figure 1 and designated 1, the free ends of the body-encircling straps being interconnected in known manner by a so-called "quick release box" 2, and the ends of the lift webs 3 passing over the wearer's shoulders to a pack (not shown) located on the back or seat of the wearer. The principal parts of the mechanism for controlling the release of the parachute from its pack are housed in a box having upper and lower parts designated 4 and 5, said box being secured for instance to one of the chest straps of the harness as indicated in Figure 1. If desired the said box may be secured to the appropriate strap 1 of the harness by providing a clamping plate 6 at the back of the box and passing such strap between the said back and clamping plate as shown in Figures 1, 3 and 4.

A rip cord 7 for freeing the parachute from its pack extends from the pack to a rip ring 8, such rip cord passing through a flexible sheath 9 (see Figure 1) from the pack to the box 4, 5, then through the box in a manner hereinafter described and through an abutment member 10 and through the side of the rip ring 8. The said rip cord is provided with an end nipple so that when the rip ring is pulled by hand the cord is pulled in a parachute-releasing direction and when the abutment member 10 is urged away from the box in a manner hereinafter described the cord is also urged in a parachute-releasing direction.

The box 4, 5 is provided with a bush 11 to which is attached a flexible sheath 12, and through such sheath extends a static line 13 serving a purpose hereinafter described.

The mechanism included in the box 4, 5, comprises a framework consisting of two plates 14 and 15 which are spaced apart by and supported on three pillars 16, 17 and 18 and a fitting 19 comprising a support for the rip cord pulling spring mechanism. The said pillars 16 and 17 have reduced end portions forming shoulders against which the said plates abut, the lower ends of said two pillars being screw-threaded for receiving nuts 20 and having extensions which pass through the base 5 of the box and through the above mentioned clamping plate 6 for engagement by other nuts 21. The upper reduced ends of the said pillars 16 and 17 are screw-threaded for engagement by further nuts and by locking sleeves 22, the upper ends of the bores of said sleeves being adapted to receive securing screws 23 passing through the cover portion of the box.

The pillar 18 has a reduced upper end which is riveted or otherwise secured to the plate 14 and a lower reduced end which extends through the base of the box and through the clamping plate 6 in a manner similar to that already described with reference to the pillars 16 and 17.

As an alternative and in some respects preferable method of securing together the parts 4 and 5 of the above mentioned box, said parts may have flanges which are secured together by means of bolts so dispensing with the above mentioned sleeves 22 and screws 23.

The fitting 19 is stepped to receive the plates 14 and 15 which are secured thereto by means of screws, and the respective parts 4 and 5 of the control box are also secured to such fitting by means of screws 24 and 25.

The above mentioned fitting 19 is formed integrally with a tubular member 26 in which a plunger 27 is slidably housed, the rip cord 7 passing through said tubular member and through said plunger for engagement with the rip ring 8.

A strong compression spring 28 is located in the housing 26 and abuts at one end against the plunger 27 and at the other end against a wall or stop 27a formed by or fitted to the said housing, said spring when in the compressed condition thus tending to urge the plunger 27 outwardly and so moving the rip cord in a parachute-releasing direction, said outward movement of the plunger being prevented or permitted in a manner now to be described.

The plunger 27 is provided with an annular groove 29 having a trailing conical face 30 for cooperation with the curved face of a pawl 31, said pawl being pivotally mounted on a lever 32 which is itself pivotally mounted on the above mentioned fitting 19 by means of a screw 33, the pawl and lever being rockable in a plane vertically bisecting the tubular member 26.

So long as the pawl 31 is maintained in the position shown in Figure 5 the plunger 27 is prevented from moving in a parachute-releasing direction, i. e. from left to right as viewed in Figure 5, but it will be appreciated that the pressure of the spring 28 and the cooperation between the plunger 27 and pawl 31 results in the lever 32 tending to swing in a clockwise direction on its pivot 33 as viewed in Figure 5, such movement if permitted to an extent resulting in the pawl 31 being retracted from the groove 29 bringing about the complete freeing of the plunger and the resulting movement of the rip cord 7 to a parachute-releasing condition i. e. to a condition in which the parachute-securing means, such as pins, are withdrawn from the parachute pack.

The pawl 31 is resiliently urged with respect to the lever 32 into the position shown in Figure 5, for instance by means of a coil spring 34, so that when the lever 32 is in the position shown in that figure the plunger 27 can still be urged into its loaded position, i. e. insertion of the plunger first swings the pawl 31 in a clockwise direction about its pivot point but as soon as the groove 29 is in registration with the pawl the latter moves under the influence of the spring 34 and effects the trapping of the said plunger in its loaded condition.

The upper end of the lever 32 is provided with a projecting pin 35 which engages a cross pin 36 extending from a spindle 37 rotatably mounted in the plates 14 and 15, and said spindle 37 has fixed thereto a toothed quadrant 38. The said quadrant is normally maintained in a position urged against a stop e. g. a plate 39, by means of a coil spring 40, one end of which spring is anchored to the plate 15 and the other end of which engages the said toothed quadrant.

The toothed quadrant 38 engages a pinion 41 which is rigid with a spindle 42 on which is also rigidly mounted a gear wheel 43, and the said gear wheel 43 engages a pinion 44 fixed on a spindle which also carries a gear wheel 45. The gear wheel 45 engages a pinion 46 fixed to a spindle 47 and fixedly mounted on said spindle is an eccentric 48.

The aforesaid eccentric 48 engages a forked member 49 which is rigidly mounted with respect to a governor disc 50 mounted on a spindle 51. The disc 50 is provided with an arcuate slot through which the spindle 47 freely extends and in order to maintain appropriate balance of the disc a corresponding opening 52 may be provided in a position diametrically opposed to the said arcuate slot.

The above described gear train between the toothed quadrant 38 and the spindle 47 results in a high velocity step-up and resultant high velocity oscillation of the disc 50 pursuant to movement of the toothed quadrant 38. There is thus a sensitive time control over any permitted movement of the said quadrant and by varying the mass of the disc 50 control can be exercised over the rate of movement of the toothed quadrant 38 in response to any pressure exerted thereon.

The spindle carrying the pinion 44 and gear wheel 45 is provided with a radial pin 53 (see Figures 3 and 4) and a spring blade 54 is movable into and out of the path of such pin. This blade presents an inclined face to the above mentioned bush 11 and an arming pin (not shown) carried by the above mentioned static line 13 can be urged through said bush into a position holding the spring blade 54 laterally flexed (to the right of the showing in Figure 4) and into the path of the radial pin 53. When the arming pin is inserted any release movement of the mechanism is positively prevented but when that pin is withdrawn then the blade flexes to its normal rest position i. e. out of the path of the pin.

The radial pin 53 is also designed for cooperation with another stop member, namely a pin 55 carried by a lever 56 which is pivotally mounted at 56ᵃ (Figures 2 and 4) in a bracket 57ᵃ secured to the plate 14.

The said lever 56 is urged by means of a coil spring 57 in a direction causing the pin 55 to come into the path of the radial pin 53, the said spring being threaded around a screwed bolt 58 extending from the plate 14 and a nut 59 being provided for abutment against the said lever and permitting of adjustment being made in the setting of said lever.

The aforesaid lever 56 is also pivotally connected to the reciprocating hub 60 of a barometric capsule 61. The latter is mounted on a plate 62 which is secured to the plate 14 by screws 63 and distance pieces 64, the pivotal connection between the said hub 60 and lever 56 including an intermediate link plate 65 so that there is freedom for the reciprocating hub 60 moving in a straight line in its bearing in plate 14 notwithstanding the angular movement of the lever 56.

The hub 60 of the barometric capsule extends through the above mentioned plate 62 and is schew threaded for engagement by a nut 66, such mode of mounting providing if desired for adjustment in the altitude setting of the barometric capsule.

The operation of the above described device is as follows:

Assuming that the device is in the loaded condition, the spring 28 is compressed, the plunger 27 is trapped by the pawl 31 engaging the recess 29 in the said plunger and the toothed sector 38 is in its starting position, i. e. the desired limiting position of its movement in a clockwise direction as viewed in Figure 2, its counterclockwise movement being prevented, when the static line arming pin is in position, (a) by the spring blade 54 being located in the path of the pin 53 carried by one of the spindles of the gear train and (b) by the barometrically controlled pin 55 also being located in the path of the said pin 53 assuming that the device is located in an atmosphere more rarefied than that at which it is set for automatic operation. In the case of any emergency, such as failure of the automatic control, the parachutist can pull the rip ring 8 thereby pulling the rip cord 7 and effecting release of the parachute. The sequence during automatic operation is however that upon falling from the aircraft by a distance determined by the length of the static line the arming pin is withdrawn from engagement with the spring blade 54 which then flexes to its normal position out of alignment with the above mentioned pin 53. If the atmospheric pressure conditions are such that the barometrically controlled pin 55 is also out of the path of the said pin 53 then the gear train is free for movement but if the atmospheric pressure is such that the capsule 61 has caused the pin 55 to advance into the paths of the pin 53 then the gear train is prevented from rotating until the parachutist has fallen to a level where the appropriate atmospheric pressure exists and at that level the automatic withdrawal of the pin 55 permits the gear train to revolve. The pressure exerted by the spring 28 now causes the plunger 27 to move slightly from left to right as viewed in Figure 5, thus urging the lever 32 in a clockwise direction. An anti-clockwise movement is imparted to the spindle 37 by means of the pins 35 and 36. The toothed quadrant is thus caused to move in an anti-clockwise direction as viewed in Figure 2 and the gears of the gear train rotate so causing rapid oscillation of the governor disc 50. After a time period determined by the characteristics of the governor disc 50 and the setting of the initial position of the toothed quadrant 38, the lever 32 will have moved so far in a clockwise direction as viewed in Figure 5 that the pawl 31 is raised out of engagement with the wall 30 of the groove 29 and the plunger 27 is thereupon freed for being urged outwardly from the sleeve 26 by means of the powerful spring 28, such plunger also urging the rip ring 8 away from the body of the control unit and so effecting movement of the rip cord into a parachute-releasing position, or as shown in my U. S. Patent 2,516,571 may flex the sheath 9 and pull the rip cord.

After the plunger 27 has moved out of the sleeve 26 the spring 40 will automatically restore the toothed quadrant 38 to its initial position so setting the gear train for a subsequent cycle of operations and the pawl 31 will be located in the position corresponding to its plunger-engaging position. It will be understood however that the plunger can be moved into the sleeve 26 owing to the pivotal mounting of the pawl 31, i. e. insertion of the plunger results in the pawl swinging in a clockwise direction as viewed in Figure 5 as the body of the plunger passes thereunder but as soon as the groove 29 registers with the pawl the latter moves into engagement with such groove under the influence of the spring 34.

As an alternative to employing means operated by a static line for preventing undesired release merely pursuant to the control unit being located in an appropriate atmosphere, manually controllable means may be provided, e. g. the arming pin for cooperation with the above-mentioned spring blade 54 may be provided with a rip ring or the like located on the outside of the device. In another arrangement such master control may be released by means of a pilot parachute for instance in the manner diagrammatically shown in Figures 6 to 8 of the accompanying drawings. In this arrangement a barometrically controlled release device 100, which it will be assumed is similar to that already described so far as its internal mechanism is concerned, is mounted on a pack 101, the rip cord 102 being provided with pins which normally maintain the pack in a closed position in the usual manner. The means for normally maintaining the above mentioned spring blade in a position preventing rotation of the gear train comprises an arming pin 103 carried by a pilot parachute 104, the said pilot parachute normally being packed in a pocket 105 on the pack 101. If desired the pilot parachute 104 may be connected to the main parachute 106 (see Figure 8) so that during the descent such parachute 104 functions as a normal pilot parachute as indicated in Figure 8 but if not required for the whole of the descent then the pilot parachute may become entirely free from the rest of the equipment upon withdrawal of the arming pin 103.

The aforesaid pilot parachute 104 may itself be released from its pocket 105 by means of a rip cord 107 (see Figure 6), such rip cord being pulled by hand or by static line connection with the aircraft, as may be desired, and effecting the rupturing of break threads or the withdrawal of locking pins or the like.

Whilst I have hereinbefore described some embodiments of the present invention I wish it to be understood that there may be various changes without department from the scope of such invention. Thus for instance the stop for the return movement of the toothed quadrant may be adjustable for the purpose of enabling control to be exercised over the time taken for the release mechanism to move through one cycle of operation.

I claim:

1. In a device for pulling parachute pack rip cords and the like the combination of a supporting frame, a powerful compression spring mounted upon the frame, a plunger linearly slidable upon the frame in position to be actuated by said spring, a lever pivotally mounted upon the frame, a pawl pivotally mounted upon the lever eccentric to the pivot mounting of the lever upon the frame, spring means normally urging the pawl into such position upon said lever that it may be individually moved on its pivot with respect to the lever, said pawl being interposed in the path of said plunger whereby the plunger can be reset on the frame by the individual pivoting of the pawl relative to its mounting upon said lever into position to hold the plunger and the plunger spring compressed, a gear train time delaying mechanism having means thereon to releasably restrain movement of said lever, and detent means to releasably restrain actuation of the gear train, the compression spring for the plunger acting upon the pawl to normally rock said lever upon its pivot mounting whereby to set said gear train timing mechanism in operation upon release of the detent means.

2. A parachute rip cord operating mechanism as set forth in claim 1 wherein spring means is provided for automatically resetting the position of the gear train and timing mechanism and movement of said lever and pawl into plunger trapping position.

3. In a parachute pack opening mechanism the combination of a supporting frame, spring actuated means carried by the frame for pulling a rip cord, detent means for holding said spring means compressed and in parachute rip cord pulling position, delayed action timing mechanism carried by the frame for controlling said detent means, a second means under manual control for releasably restraining actuation of the timing mechanism, a barometric motor responsive to barometric pressure of surrounding atmosphere including a pressure actuated movable portion, a second lever pivoted upon said frame, means connecting the movable portion of the barometric mechanism to said second lever eccentric to the pivot mounting of the second lever upon said frame, a detent upon the second lever in position to restrain operation of said timing mechanism, spring means normally urging the second lever into position for restraining actuation of the timing mechanism, the pivoted connection of the movable part of the barometric mechanism being interposed between said spring last mentioned and the pivot mounting of the second lever upon the frame whereby upon movement to pivot the second lever against action of its spring and remove the second lever from restraining position with respect to said timing mechanism.

4. In a parachute release mechanism the combination of a supporting frame, a plunger slidable upon the frame, a compression spring upon the frame for actuating the plunger for rip cord pulling purposes, said plunger having a recess therein, a lever pivoted upon said frame in non-obstructing position with respect to actuation of the plunger upon the frame, a pawl pivoted upon said lever eccentric to the lever's pivot upon the frame and in position to engage in the recess of the plunger for holding the plunger in position with the spring compressed when the lever assumes a predetermined position upon the frame, spring means normally holding the lever and the pawl in such relation that the pawl may be individually moved relative to the lever for resetting the plunger, and releasable timing mechanism for controlling pivoting of the lever upon the frame whereby to obtain a delayed action release of the pawl with respect to the plunger.

5. A parachute release mechanism as described in claim 4 wherein means is provided to automatically reset the delayed action timing mechanism and to move said lever into pawl trapping position upon the frame with respect to said plunger.

6. In a parachute pack opening device the combination of a supporting frame, a compression spring carried by the frame, means for associating the spring with a parachute pack rip cord whereby upon expansion the spring will operate a rip cord for releasing a parachute, a detent mechanism restraining the release of said spring, delayed timing mechanism for controlling the release of said detent mechanism, the spring acting with its compressive force against the detent mechanism for operating said timing mechanism.

7. A parachute pack operating device as set forth in claim 6 wherein resilient means is provided for automatically resetting the timing mechanism to a starting position after the cycle of movement for effecting the release operation of the rip cord has been completed.

8. In a time actuator mechanism for pulling the rip cords of parachute packs the combination of a supporting frame, a movable member for actuating a parachute rip cord mounted upon said frame, a powerful compression spring carried by the frame for actuating said member, a detent mechanism restraining the release of said spring and restraining the movement of said member, delaying timing mechanism for controlling the release of said detent mechanism, means imparting the compressive force of the spring to said detent mechanism for actuating said timing mechanism through its cycle of operation, and controlled means for holding said timing mechanism inoperative.

9. In a time actuator mechanism for operating parachute pack rip cords the combination of a supporting frame, a plunger slidably carried by said frame, a powerful compression spring mounted upon the frame and tending to actuate said plunger for rip cord operation, a lever pivoted upon said frame, a pawl pivoted upon said lever eccentric to the latter's pivot and rockable therewith, spring means normally holding the lever and its pawl so that the pawl releasably holds said plunger in position with the powerful spring compressed with the force of said spring acting against said pawl with a tendency to rock said lever to a position so that the pawl will release from its restraining engagement with respect to the plunger upon rocking of the lever to a predetermined degree, a delaying action timing mechanism carried by the frame having a detent normally positioned for holding said lever upon said frame so that its pawl restrains said plunger and holds the spring thereof compressed, and controlling means for releasably restraining actuation of said timing mechanism.

10. In a time-actuator mechanism for releasing the rip cords of parachute packs the combination of a supporting frame, a reciprocable rip cord pulling plunger carried by said frame, a powerful compression spring upon the frame normally moving said plunger to a parachute rip cord pulling position, said plunger having a groove inwardly of the external surface thereof, a lever pivoted upon said frame adjacent to said groove, a pawl eccentrically pivoted upon said lever and in position to extend into said groove when the lever is in a predetermined position for restraining movement of said plunger against the compression of its spring, spring means upon the lever and pawl for actuating the pawl and normally throwing it into said restraining position, delayed timing mechanism for controlling the movement of said lever and release of said pawl with respect to said plunger including a movable detent, controlling means for actuating the movement of said delayed action timing mechanism, the force of the compression spring of said plunger normally urging the pawl and the lever tending to rock the lever to a pawl releasing position, the force of said spring when the detent of said delayed action timing mechanism holds the lever in a restraining position on the pawl with respect to the plunger having a normal tendency to actuate said delayed action timing mechanism through its cycle of operation.

References Cited in the file of this patent

UNITED STATES PATENTS

| Number | Name | Date |
|---|---|---|
| 2,470,457 | Bancora | May 17, 1949 |
| 2,492,063 | Quilter | Dec. 20, 1949 |
| 2,505,869 | Quilter | May 2, 1950 |
| 2,525,608 | Kuntz | Oct. 10, 1950 |

FOREIGN PATENTS

| Number | Country | Date |
|---|---|---|
| 601,829 | Great Britain | May 13, 1948 |